United States Patent
Reck et al.

[15] 3,683,010
[45] Aug. 8, 1972

[54] PLANT HORMONE CARBOXYLIC ACID SALTS OF ALIPHATIC POLYAMINES

[72] Inventors: Richard A. Reck, Hinsdale; Walter W. Abramitis, Downers Grove, both of Ill.

[73] Assignee: Armour Industrial Chemical Company

[22] Filed: Sept. 26, 1966

[21] Appl. No.: 581,725

Related U.S. Application Data

[63] Continuation-in-part of Ser. No. 300,108, Aug. 5, 1963, abandoned.

[52] U.S. Cl. ......260/501.16, 260/501.2, 260/501.17, 260/326.13, 260/347.3, 71/96, 71/88, 71/114, 71/115, 71/116, 71/117
[51] Int. Cl. .............................................C07c 63/50
[58] Field of Search...260/501 N, 501 W, 326.13, 347.3, 260/501.2, 501.16, 404.5; 71/113–117

[56] References Cited

UNITED STATES PATENTS

| | | | |
|---|---|---|---|
| 3,206,485 | 9/1965 | Pflaumer | 260/501.16 |
| 2,900,411 | 8/1959 | Harwood et al. | 71/2.6 |

FOREIGN PATENTS OR APPLICATIONS

| | | |
|---|---|---|
| 1,402,696 | 7/1964 | France |

Primary Examiner—Leon Zitver
Assistant Examiner—M. W. Glynn
Attorney—Francis W. Young

[57] ABSTRACT

Plant hormone carboxylic acid salts of aliphatic polyamines having at least six carbon atoms in an aliphatic radical thereof, useful as herbicidal agents.

5 Claims, No Drawings

PLANT HORMONE CARBOXYLIC ACID SALTS OF ALIPHATIC POLYAMINES

This application is a continuation-in-part of copending application Ser. No. 300,108, filed Aug. 5, 1963, now abandoned.

Plant hormone carboxylic acids are believed to kill certain vegetation by stimulating the plants to excessive growth while having no unusual stimulating effect upon other vegetation. The use of such acids with other compounds, including aliphatic amines, has been found effective in controlling many types of weeds and other plants. One difficulty, however, has been the tendency for the product to volatilize in air currents and to be applied to plants which are not intended to be destroyed. For example, it is common to apply the herbicide composition alongside roadways and adjoining crops, such as cotton, vegetable plants, etc., which must be protected from the action of the composition. Unfortunately, the herbicide composition can become airborne under the circumstances of spraying or other application, and serious damage to the beneficial plants is caused.

We have discovered that by reacting a polyamine having at least six carbon atoms in an aliphatic radical with a plant hormone carboxylic acid, thus forming a salt, a highly effective herbicide, having substantially no tendency to volatilize in air currents, is obtained, thus permitting the composition to be sprayed all about a plant to destroy the weeds, etc., without injury to the plant. Not only does the composition become nonvolatile so that it can be safely applied by spraying along a marginal area without danger of drifting, but also the composition has enhanced weed-killing values in providing better root penetration and slow-acting destruction.

A primary object of the invention, therefore, is to provide plant hormone carboxylic acid salts of higher aliphatic diamines which produce the above-described new results. A further object is to provide diamine or polyamine salts of herbicidal acids which are oil-soluble and which may be dispensed in oil-and-water emulsions, and which provide a heavier molecule composition having little tendency to drift with air currents when applied by spraying. A still further object is to provide a diamine salt herbicidal composition having unique properties enabling it to be applied around plants for the destruction of weeds but without injuring the plant. Other specific objects and advantages will appear as the specification proceeds.

In one embodiment of our invention, an aliphatic diamine having preferably from six to 23 carbon atoms in a aliphatic radical thereof is reacted with a plant hormone carboxylic acid to form a salt of the two substances. The resulting composition is oil soluble and can be applied in organic solvents, such as kerosene, xylene, aromatic oils, acetone, diacetone, isopropanol, etc. If desired, an oil-in-water emulsion may be formed and the composition applied in such an emulsion. The application can be by spraying and, by way of specific example, it can be stated that the spray can be applied about a peony bush for destroying the weeds about the bush without contacting and injuring the peony plant.

The aliphatic diamine may be any aliphatic diamine having six to 23 carbon atoms in an aliphatic radical thereof. A representative formula of preferred diamines is $RNHCH_2CH_2CH_2NH_2$ in which R is an aliphatic group having from six to 23 carbon atoms. The diamines may be obtained from fatty acids of natural fats or oils, such as tallow, soybean oil, cottonseed oil, coconut oil, or from fractions of these natural acid mixtures, saturated or unsaturated. Also, the diamines may be obtained from sources such as unsaturated acids and olefins. The long chain hydrocarbon radical may be straight chain or branched chain and saturated or unsaturated. The diamine may be alkoxylated with a compound such as ethylene or propylene oxide, either adding a $\beta$-hydroxyalkyl group or a higher adduct thereof, preferably from about 3 to 20 moles of alkylene oxide per mole of diamine.

Other polyamines may be utilized in this invention. Particularly suitable are tri amines and tetra amines. Specifically, tri amines produced by monocyanoethylation of any of the above-mentioned diamines followed by reduction of the nitrile group to an amine are suitable for use in this invention. Likewise, tetra amines may be produced by dicyanoethylation of diamines, and particularly diamines having two primary amino groups such as aminostearylamine.

The plant hormones occur generally in the form of carboxylic acids. Examples are 2,4-dichlorophenoxyacetic acid 2,4,5-trichlorophenoxyacetic acid, methylchlorophenoxyacetic acid chlorinated benzoic acid, dichloropropionic acid, $\beta$-indolylacetic acid,$\alpha$-naphthaleneacetic acid, indolylbutyric acid, indolylpropionic acid, phenylacetic acid, fluoroacetic acid, 2,5-dichloro-3-nitro benzoic acid, 3-amino-2,5-dichloro benzoic acid, and 3,6-endoxohexahydrophthalic acid.

The reaction between the amine and the carboxylic acid may be carried out in any suitable manner. For example, the two substances may be mixed in a solvent and warmed until a homogeneous solution is obtained, and then cooled until precipitation of the salt is complete, after which it may be filtered and dried.

The resulting salts are viscous liquids which may be then dissolved in organic solvents or emulsified to form oil-in-water emulsions, and the composition applied by spraying or by other suitable means to the area about the plants, etc.

The following specific examples are illustrative of our invention.

EXAMPLE I

Thirty six grams of N-oleyl trimethylenediamine and 22.1 grams of 2,4-dichlorophenoxy acetic acid were mixed together and warmed until a clear solution was obtained. When cooled, the viscous product obtained was a 2,4-dichlorophenoxyacetic acid mono salt of N-oleyl trimethylenediamine.

EXAMPLE II

Thirty six grams of N-tallow trimethylenediamine and 22.1 grams of 2,4-dichlorophenoxyacetic acid were mixed together in ethyl acetate and warmed until clear. The product, 2,4-dichlorophenoxyacetic acid mono salt of N-tallow trimethylenediamine was cooled, filtered and dried.

EXAMPLE III

Thirty six grams of N-tallow trimethylenediamine and 44.2 grams of 2,4-dichlorophenoxyacetic acid were mixed together in 100 grams of benzene. The mixture was warmed until solution was obtained, then cooled, filtered and dried. The product was 2,4-dichlorophenoxyacetic acid di salt of N-tallow trimethylenediamine.

EXAMPLE IV

In like fashion, the following plant hormone carboxylic acid salts of polyamines were prepared:

2,4-dichlorophenoxyacetic acid mono and di salts of N-soya trimethylenediamine.

2,4,5-trichlorophenoxyacetic acid mono and di salts of N-oleyl trimethylenediamine.

2,4,5-trichlorophenoxyacetic acid mono and di salts of N-soya trimethylenediamine.

2,4,5-trichlorophenoxyacetic acid mono and di salts of N-tallow trimethylenediamine.

2,4-dichlorophenoxyacetic acid di salt of N-oleyl trimethylenediamine.

Dimethyl arsenic acid di salt of N-tallow trimethylenediamine (ethoxylated with 3 ethylene oxide).

2,5-dichloro-3-nitrobenzoic acid mono salt of aminomethylstearylamine.

2,4-dichlorophenoxyacetic acid tri salt of N-tallow-N'-($\gamma$-aminopropyl)-trimethylenediamine.

3-amino-2,5-dichlorobenzoic acid salt of aminomethylstearylamine.

3,6-endoxohexahydrophthalic acid mono and di salts of aminomethylstearylamine.

2,4-dichlorophenoxyacetic acid mono and di salts of aminomethylstearylamine.

3-amino-2,5-dichlorobenzoic acid di salt of N-tallow trimethylenediamine (ethoxylated with 3 moles ethylene oxide).

2,5-dichloro-3-nitrobenzoic acid di salt of N-tallow trimethylenediamine (ethoxylated with 3 moles ethylene oxide).

3,6-endoxohexahydrophthalic acid salt of N-($C_{11}$-$C_{14}$ sec-alkyl) trimethylenediamine.

2,4-dichlorophenoxyacetic acid salt of N-(1-hendecyldodecyl) N,N'-diethyl trimethylenediamine.

2,4-dichlorophenoxyacetic acid salt of N-(1-methyloctadecyl) N,N'-diethyl trimethylenediamine.

2,4-dichlorophenoxyacetic acid mono and di salts of N-(xylylstearyl) trimethylenediamine.

3,6-endoxohexahydrophthalic acid mono and di salts of N-(xylylstearyl) trimethylenediamine.

3,6-endoxohexahydrophthalic acid mono and di salts of N,N,N',N' tetramethyl aminomethylstearylamine.

2,4-dichlorophenoxyacetic acid mono and di salts of N,N,N', N' tetramethyl aminomethylstearylamine.

3,6-endoxohexahydrophthalic acid mono and di salts of N-(phenylbehenyl) trimethylenediamine.

2,4-dichlorophenoxyacetic acid mono and di salts of N-(phenylbehenyl) trimethylenediamine.

$\alpha,\alpha$-dichloropropionic acid mono and di salts of N-($C_7$–$C_9$ sec-alkyl) trimethylenediamine.

2,4-dichlorophenoxyacetic acid tri salt of N-oleyl-N'-($\gamma$-aminopropyl)-trimethylenediamine.

$\beta,\beta$-dichloropropionic acid mono and di salts of N-($C_{15}$ – $C_{20}$ sec-alkyl) trimethylenediamine.

$\alpha,\alpha$-dichloropropionic acid mono and di salts of N-($C_{15}$ – $C_{20}$ sec-alkyl) trimethylenediamine(ethoxylated with 3 moles ethylene oxide).

$\alpha,\alpha$-dichloropropionic acid mono and di salts of N-oleyl trimethylenediamine.

$\alpha,\alpha$-dichloropropionic acid mono and di salts of N-tallow trimethylenediamine (ethoxylated with 10 moles ethylene oxide).

EXAMPLE V 2,4-dichlorophenoxyacetic acid mono salt of N-oleyl trimethylenediamine prepared as described in Example I was dissolved in kerosene and applied at the rate of 8 to 14 pounds of active ingredients per acre to a right-of-way adjoining cotton, the composition being applied as a spray. The composition was effective against sumac, sassafras, as well as weeds, and while the right-of-way was rendered free of weeds up to the fence adjacent the cotton plants, no damage to the cotton was found.

EXAMPLE VI

Oil-soluble, water-emulsifiable 2,4-dichlorophenoxyacetic acid mono salt of N-oleyl trimethylenediamine and 2,4,5-trichlorophenoxyacetic acid mono salt of N-oleyl trimethylenediamine were tested in areas adjacent to plants which would be damaged by the action of the composition if brought in contact therewith, the exposure being for a seven-day period. It was found that no leaf modification occurred, while in contrast 2,4-D formulations under similar circumstances brought about a degree of lead modification, indicating substantial volatility.

EXAMPLE VII 2,4-dichlorophenoxyacetic acid mono salt of N-oleyl trimethylenediamine prepared as described in Example I was applied to a golf course for the elimination of weeds. About two quarts of the composition in an oil-in-water emulsion was applied per acre and successfully eliminated weeds while leaving a flourishing grass turf.

EXAMPLE VIII

Diamine salts of plant hormone carboxylic acids were applied to various crops and weeds to ascertain their selective herbicidal action. Table I shows the results of pre-emergence application of chemical.

EXAMPLE IX

Diamine salts of plant hormone carboxylic acids were applied to different crops and weeds to illustrate their effective and selective herbicidal action. Table II shows the results of post-emergence application of chemical.

TABLE I

| Chemical | Pounds per acre | Injury rating* | | | | | | | | Weeds | |
|---|---|---|---|---|---|---|---|---|---|---|---|
| | | Corn | Soybean | Cotton | Sugar beet | Spinach | Wheat | String bean | Cucumber | Broadleaf | Grass |
| 2,5-dichloro-3-nitrobenzoic acid mono salt of aminomethylstearylamine | 1 | 0 | | | | | | 5 | 8-D | 10 | 10 |
| | 2 | 0 | | 0 | 1 | 9 | 0 | 5 | 5-D | 9 | 4 |
| | 4 | 0 | | 1-D | 2 | 9 | 5 | | | 10 | 2 |
| 2,4-dichlorophenoxyacetic acid mono salt of aminomethylstearylamine | 0.75 | 0 | 1 | 0 | 0 | 0 | 0 | | | 9 | 6 |
| | 2 | 0 | 0 | 0 | 1 | 0 | 0 | | | 8 | 5 |
| 2,4-dichlorophenoxyacetic acid di salt of aminomethylstearylamine | 0.75 | 0 | 3-D | 1 | 4 | 1-D | | | | 9 | 3 |
| | 2 | 0 | 2 | 0 | 0 | 3 | | | | 10 | 5 |
| 3-amino-2,5-dichlorobenzoic acid di salt of N-sec-tridecyl trimethylenediamine (ethoxylated with 3 moles ethylene oxide) | 1 | | 9 | | | | | 4-D | 0 | 10 | 10 |
| | 2 | 0 | 5 | 2 | 0 | 0 | 2 | 2 | 3 | 9 | 7 |
| | 4 | 0 | 8 | 0 | 1 | 3 | 0 | | | 2 | 4 |
| 2,5-dichloro-3-nitrobenzoic acid di salt of N-sec-tridecyl trimethylenediamine (ethoxylated with 3 moles ethylene oxide) | 1 | 0 | | | | | | | | 10 | 10 |
| | 2 | 0 | | | | | | | | 9 | 8 |
| 3,6-endoxohexahydrophthalic acid mono salt of N-(C15–C20 sec-alkyl) trimethylenediamine | 4 | 0 | 10 | 10 | 10 | 10 | 8 | | | 4-D | 5-D |
| | 8 | 10 | 9-D | 10 | | | 9 | | | 6 | 9 |

*Rating:
0 = No injury.
1 = Slight injury.
5 = Moderate injury.
9 = Very heavy injury.
10 = Plants dead.
D = Dwarfed.

TABLE II

| Chemical | Pounds per acre | Injury rating* | | | | | | | Weeds | |
|---|---|---|---|---|---|---|---|---|---|---|
| | | Corn | Soybean | Sugar beet | Red beet | Wheat | Sorghum | Cotton | Broadleaf | Grass |
| 3,6-endoxohexahydrophthalic acid mono salt of N-(C11–C15 sec-alkyl) trimethylenediamine | 4 | 3 | 8.5 | 0 | 0 | | 6 | | 10 | 8.5 |
| | 8 | 8 | 9.5 | 4.5 | 4.5 | | 9.5 | | 10 | 9.5 |
| 2,4-dichlorophenoxyacetic acid di salt of aminomethylstearyl amine | 0.5 | 0 | 9-H | 8-H | 9-H | 0.5 | | | 8-H | 0 |
| | 1 | 2 | 10 | 10 | 10 | 0.5 | | 10 | 9.5 | 0 |

*Ratings same as Table I with addition of: H = Hormonal curvature.

EXAMPLE X

Diamine salts of plant hormone carboxylic acids were applied pre-emergence to a soybean crop to ascertain germination and injury to the soybean crop and weed control. Results are shown below in Table III.

TABLE III

| Chemical | lbs per acre | Soybean % germination | Injury Rating* | Weed Control — Injury Rating* | |
|---|---|---|---|---|---|
| | | | | Broadleaf | Grass |
| 2,4-dichlorophenoxyacetic acid salt of N-1-hendecyldodecyl) N,N'-di-ethyl trimethylenediamine | 0.5 | 70 | 0 | 0 | 0 |
| | 1 | 100 | 1 | 10 | 0 |
| 2,4-dichlorophenoxyacetic acid salt of N-1-methyl-octadecyl) N,N'-diethyl trimethylenediamine | 0.5 | 100 | 1 | 9 | 1 |
| | 1 | 100 | 1 | 9.8 | 4 |

*Ratings same as Table I

EXAMPLE XI

One mole of N,N'-(γ-aminopropyl)-aminomethylstearylamine (50 percent active in isopropanol) was warmed to about 70° C and four moles of 2,4-dichlorophenoxyacetic acid were added slowly. During this addition the temperature was maintained at about 70° to 80° C and agitation was provided by a nitrogen sparger until the reaction was complete. The product was the 2,4-dichlorophenoxyacetic acid tetra salt of N,N'-(γ-aminopropyl)-aminomethylstearylamine.

The terms oleyl, soya, coco and tallow refer to mixtures of long chain hydrocarbon radicals derived from oleic acid and fatty acids derived from soybean, coconut and tallow sources respectively.

While in the foregoing specification we have set forth illustrative embodiments in considerable detail for the purpose of explaining the invention, it will be understood that such detail or details may be varied widely by those skilled in the art without department from the spirit of our invention.

We claim:

1. As a herbicidal agent, a plant hormone carboxylic acid salt of a trimethylenediamine selected from the group consisting of N-oleyl, N-soya, N-coco and N-tallow trimethylenediamine.

2. The compound of claim 1 in which the plant hormone is 2,4-dichlorophenoxyacetic acid.

3. The compound of claim 1 in which the plant hormone is 2,4,5-trichlorophenoxyacetic acid.

4. As an herbicidal agent, the N-oleyl trimethylenediamine salt of 2,4-dichlorophenoxyacetic acid.

5. As an herbicidal agent, the N-oleyl trimethylenediamine salt of 2,4,5-trichlorophenoxyacetic acid.

* * * * *